United States Patent
Bo

(10) Patent No.: US 7,384,564 B2
(45) Date of Patent: Jun. 10, 2008

(54) ELECTROLYTIC CELL AND PROCESS FOR REMOVAL OF BROMIDE IONS AND DISINFECTION OF SOURCE WATERS USING SILVER CATHODE AND/OR DIMENSIONALLY STABLE ANODE (DSA): A PROCESS FOR THE REDUCTION OF DISINFECTANT/DISINFECTION BYPRODUCTS IN DRINKING WATER

(76) Inventor: Labisi Bo, 12165 Via Santa Rosa, Los Angeles, CA (US) 91342

( * ) Notice: Subject to any disclaimer, the term of this patent is extended or adjusted under 35 U.S.C. 154(b) by 0 days.

(21) Appl. No.: 11/465,542

(22) Filed: Aug. 18, 2006

(65) Prior Publication Data

US 2007/0187337 A1  Aug. 16, 2007

Related U.S. Application Data

(60) Provisional application No. 60/773,745, filed on Feb. 16, 2006.

(51) Int. Cl.
*C02F 1/46* (2006.01)

(52) U.S. Cl. ........................ 210/748; 210/754; 210/764

(58) Field of Classification Search ................ 210/748, 210/754, 764
See application file for complete search history.

(56) References Cited

U.S. PATENT DOCUMENTS

| | | | |
|---|---|---|---|
| 4,381,979 A | | 5/1983 | De Nora |
| 4,488,945 A | * | 12/1984 | Spaziante ................ 205/349 |
| 5,314,589 A | | 5/1994 | Hawley |
| 5,705,050 A | * | 1/1998 | Sampson et al. ........... 205/687 |
| 6,391,186 B1 | | 5/2002 | Stauffer |
| 6,689,263 B1 | * | 2/2004 | Stauffer ..................... 204/291 |
| 6,800,206 B2 | | 10/2004 | Robinson |

OTHER PUBLICATIONS

USEPA, "Implementation Guidelines for the Stage 1 Disinfectants/Disinfection Byproducts Rule". Office of Water (4606), Jun. 2001, EPA 816-R-01-012, p. 1-4. US.
AwwaRF, "Information Collection Rule Data Analysis". 2002, p. 142. US.
AwwaRF, "Survey of Bromide in Drinking Water and Impacts and Impacts on DBP Formation". 1994, p. 2. US.
Calfed Bay-Delta Program, "Water Quality Program Plan, Final Programmatic EIS/EIR, Technical Appendix". Jul. 2000, p. 327-5.7. US.

(Continued)

*Primary Examiner*—Walter D. Griffin
*Assistant Examiner*—Cameron J Allen
(74) *Attorney, Agent, or Firm*—Lauson & Schewe LLP

(57) ABSTRACT

Electrolytic process combines disinfection with removal of bromide from raw water. Current is applied to the electrodes in an electrolytic cell with raw water that has some salinity as the electrolyte. The electrodes consist of silver or dimensionally stable anodes (DSA) as cathodes and dimensionally stable anodes (DSA) arranged in parallel baffling fashion. During electrolysis chloride is converted to chlorine. The chlorine immediately effects disinfection of the water and reduction of bromide ions to bromine gas which is liberated from the cell. Aqueous bromine will remain in solution as hypobromous acid. The extent of chlorine generation and bromide loss depend upon the chloride:bromide ratio, electrical energy supplied for electrolysis, ionic strength of the water, electrode distance, cell residence time and electrode material.

3 Claims, 6 Drawing Sheets

OTHER PUBLICATIONS

Grinbaum and Freiberg, "Bromine". Othmer Encyclopedia of Chemical Technology, 2001, John Wiley & Sons, Inc. US.

Austin, "Shreve's Chemical Process Industries". Fifth Edition, McGraw-Hill, Inc. 1984, p. 351. US.

Yasmine, et al, "Chemical transformation of bromine chloride at the air/water interface". Journal of Aerosol Science, 2001, vol. 32 p. 893-911.

Qian and Margerum, "Equilibruim and Kinetics of Bromine Chloride Hydrolysis". Environ. Sci. Technol. 2001, 35 pp. 1127-1133.

Kimbrough D.E.K, Suffet, I.H. Electrochemical removal of bromide and reduction of THM formation potential in drinking water, Water Research 36 (2002) 4902-4906.

Wan, C.C et al. Electrolytic Decomposition of Cyanide Effluent with an Electrochemical Reactor Packed with Stainless Steel Fiber, Wat. Res. vol. 24, No. 11, pp. 1317-1321, 1990.

Murphy, O et al. Direct Electrochemical Oxidation of Organics for Wastewater Treatment, Wat. Res. vol. 26, No. 4, pp. 443-451, 1992.

Fiori, G et al. Electroreduction of volatile organic halides on activated silver cathodes, Journal of Applied Electrochemistry (2005) 35:363-368.

* cited by examiner

TOP VIEW

ELECTROLYTIC CELL AND PROCESS FOR REMOVAL OF BROMIDE IONS AND DISINFECTION OF SOURCE WATERS USING SILVER CATHODE AND/OR DIMENSIONALLY STABLE ANODE (DSA): A PROCESS FOR THE REDUCTION OF DISINFECTANT/DISINFECTION BYPRODUCTS IN DRINKING WATER

BACKGROUND OF THE INVENTION

1. Field of the Invention

This invention pertains to electrolysis with emphasis on treatment of drinking water. It is an electrolytic process for water treatment utilizing electrical energy directly applied to the water being treated to generate halogen ions.

2. Description

The carcinogenic effects of disinfection byproducts (DBP) in chlorinated municipal drinking water supply prompted this invention. The presence of Natural Organic Matter (NOM as Total Organic Carbon—TOC) and bromide (mainly from estuaries) in raw water, commonly known as DBP precursors, leads to the formation of carcinogenic halogenated organic contaminants in drinking water upon subsequent chlorination. The brominated species in this class of contaminants have been shown to have significantly higher health effects compared to non-brominated species. This invention substantially reduces the amount of bromide available to form brominated disinfection byproducts.

Since the discovery of chlorination byproducts in drinking water in 1974, numerous toxicological studies have been conducted that show some DBPs to be carcinogenic and/or cause reproductive or developmental effects in laboratory animals. Additionally, exposure to high levels of disinfectants over long periods of time may cause health problems, including damage to blood and kidneys. While many of these studies have been conducted at high doses, the weight-of-evidence indicates that DBPs present a potential public health problem that must be addressed. USEPA Stage 1 DBP Rule limits Total Trihalomethanes (TTHM) to 80 µg/L Running Annual Average system-wide but Stage 2 will extend that limit to individual sample locations. Surface water sources that have links to estuaries or groundwater wells subject to influence of the sea exacerbate the tendency to form DBPs upon subsequent chlorination because of the presence of bromide in the water. These salt water intrusions result in significant levels of bromide which plays an important role in the relative concentrations of disinfection by product (DBP) species formed. Several researchers have reported that speciation shifted to the bromine-substituted THMs as a function of bromide concentration when all other parameters were held constant. Under conditions of high NOM and low bromide concentrations, chlorine-substituted byproducts predominated, especially during longer reaction times as the original bromide was consumed. In the presence of chlorine and precursor, as much as 50% of the bromide ion can become incorporated into the trihalomethane (THM) species bromodichloromethane, dibromochloromethane, and bromoform; this efficiency of bromide incorporation implies that 100 µg/L of bromide may result in up to 50 µg/L of THM-bound bromine (THM-Br). A reduction in bromide concentration will have a significant impact on the concentration and speciation of formed TTHM. Reverse osmosis and nanofiltration can reject 90% and 50% bromide respectively, but need residual handling capabilities and have low water recovery. It is also within the realm of possibilities that in the future, beyond Stage 2 DBP Rule, USEPA may set MCLs for individual DBP species that will warrant reduction in bromide concentration in the source water.

Chloramine has been employed as alternative disinfectant by many utilities to minimize the level of TTHMs formed from treating water with high concentration of precursors, however recent developments have implicated chloramine in the formation of nitrogenous DBPs like NDMA, cyanogen chloride and cyanogen bromide. Also, nitrification and the resulting odor is a common distribution system problem associated with chloramination.

Granular Activated Carbon (GAC) is effective in removing the main DBP precursor, TOC, from raw water but the replacement frequency in order to meet the DBP rule may make the cost of the process prohibitive especially when bromide is present in concentration above 100 µg/L. Electrolysis using silver electrodes and/or DSA to reduce bromide concentration in synergy with enhanced coagulation and a technology to reduce TOC will provide another option to achieve the treated water goal—less than 80 µg/L TTHM in the distribution system after 3 days—at a competitive cost.

STATE OF THE ART

In U.S. Pat. No. 6,391,186, Stauffer patented an electrochemical process for removing or modifying ions in solution incorporating an electrolytic cell comprising a bipolar bed of conductive and non-conductive particulate material spaced between two electrodes (made of graphite, platinum plated substrate such as titanium, or lead) which an electrical voltage is applied causing the removal or modification of the ions. Application of this process is geared towards treatment of waste streams from plating operations and other metal finishing processes to prevent environmental pollution. Additional applications include hydrometallurgical processes used to extract non-ferrous metals from ores. The use of this disclosure for large scale municipal water treatment is either impractical or will be too expensive because of the requirements of the particulates. First, there should be minimum restriction to the flow of solution through the cell. Second, it is desirable to achieve a maximum electrode surface for a given cell size. These two requirements are contradictory so that a compromise must be reached in determining the size of the particulates.

It is typical of electrolysis processes used for separation or generation of halogen to include ion exchange membranes that separate the cathode and anode. In such situations, cations and anions are kept separate in different chambers of the electrolytic cell and are maintained in solution for the collection of aqueous halogen product from electrolysis of aqueous halide like brine or hydrochloric acid. In U.S. Pat. No. 4,381,979, De Nora, et al disclosed a method of generating halogen which comprises electrolyzing an aqueous halide such as hydrochloric acid or alkali metal chloride in an electrolytic cell having a pair of opposed electrodes separated by an ion exchange polymer to generate elemental chlorine. Electrolysis of brine using tightly packed DSA electrodes without ion exchange membranes is a common commercial method for on-site generation of chlorine as sodium hypochlorite that is used by many water treatment plants. Such process disclosed by Hawley in U.S. Pat. No. 5,314,589 that uses a generator with very thin electrodes placed close together is for use in a pool filtration system. The electrodes generate very active chlorine ions in solution which serve as a biocide, without creating harmful chlorine gases. Other forms of electrolysis in water treatment utilize sacrificial anode to provide dissolved ions to the water as current passes between the pairs of electrodes. An example is the disclosure by Robinson in U.S. Pat. No. 6,800,206 whereby electroflocculation and/or electrocoagulation reactions are used to treat water.

Kimbrough and Suffet described a process similar to "blowing out" disclosed in a patent by Herbert Henry Dow around 1889 and comparable to Wunsche and Kossuth process whereby they used carbon rod cathodes and DSA rods in a flow through electrolytic reactor and then used carbon dioxide to strip bromine from the solution. Compared to the disclosure in this application, efficiency of bromide removal is substantially improved without stripping because of high silver conductivity and large electrode surface contact area with flat plates and several passes through the cell.

Existing electrolysis techniques for water treatment is mostly directed at making disinfectants or coagulating particles from the water. Where removal of ions is disclosed, there are several limitations associated with the techniques for municipal water treatment especially the use of particulates within the cell, the type of electrodes employed and configuration of electrolytic cell or reactor. This disclosure offers a cheaper and practical option for electrolytic removal of bromide ions in source water to drinking water treatment facilities.

BRIEF SUMMARY OF THE INVENTION

It is an objective of this invention to remove bromide in source water to concentration below 100 µg/L. It is also an objective of this invention to reduce 3 day Simulated Distribution System THM (SDS THM) formation to less than 80 µg/L via a combination of electrolytic bromide removal and TOC removal using coagulation, flocculation, sedimentation, and GAC filtration. It is yet another objective to extend the life of the GAC at 15 minute Empty Bed Contact Time (EBCT) far beyond the typical 60-120 days by maintaining biological activity. By reducing the concentration of bromide to less than 100 µg/L, the need for GAC to reduce TOC concentration below 1 mg/L is unnecessary. Biologically active GAC will maintain effluent TOC at 1.5 mg/L for much longer than 120 days. TOC concentration of $\leq 1.5$ mg/L and bromide below 100 µg/L will produce TTHM less than 80 µg/L after 3 days in a typical distribution system whereas at higher bromide level, brominated species will dominate and increase TTHM concentration above 80 µg/L under the same circumstances.

The invention and the manner of operation will be explained with attached drawings and the detailed description below.

DETAILED DESCRIPTION OF THE INVENTION

Figure 2:
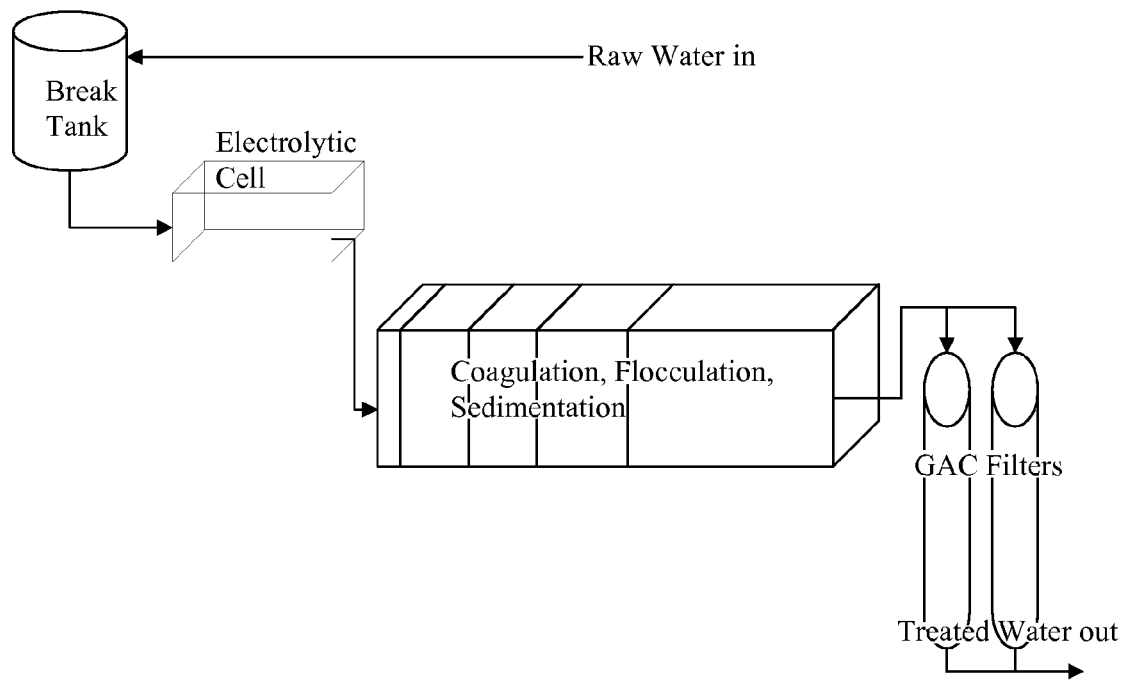
FIG. 2 Process train schematic showing flow of water from source to the treated effluent.
Figure 4:
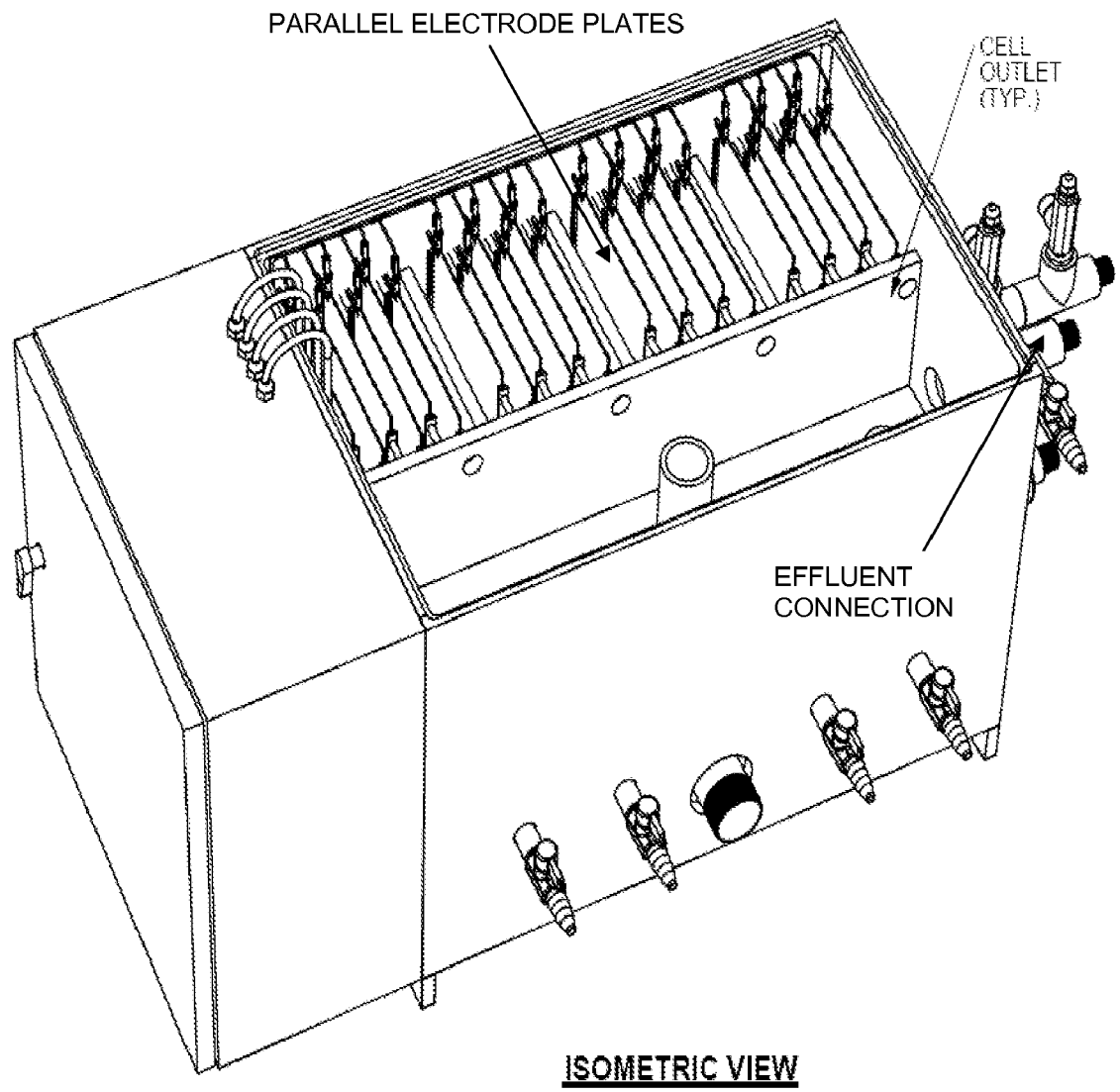
FIG. 4 Isometric view of the electrolytic cell.
Figure 5:
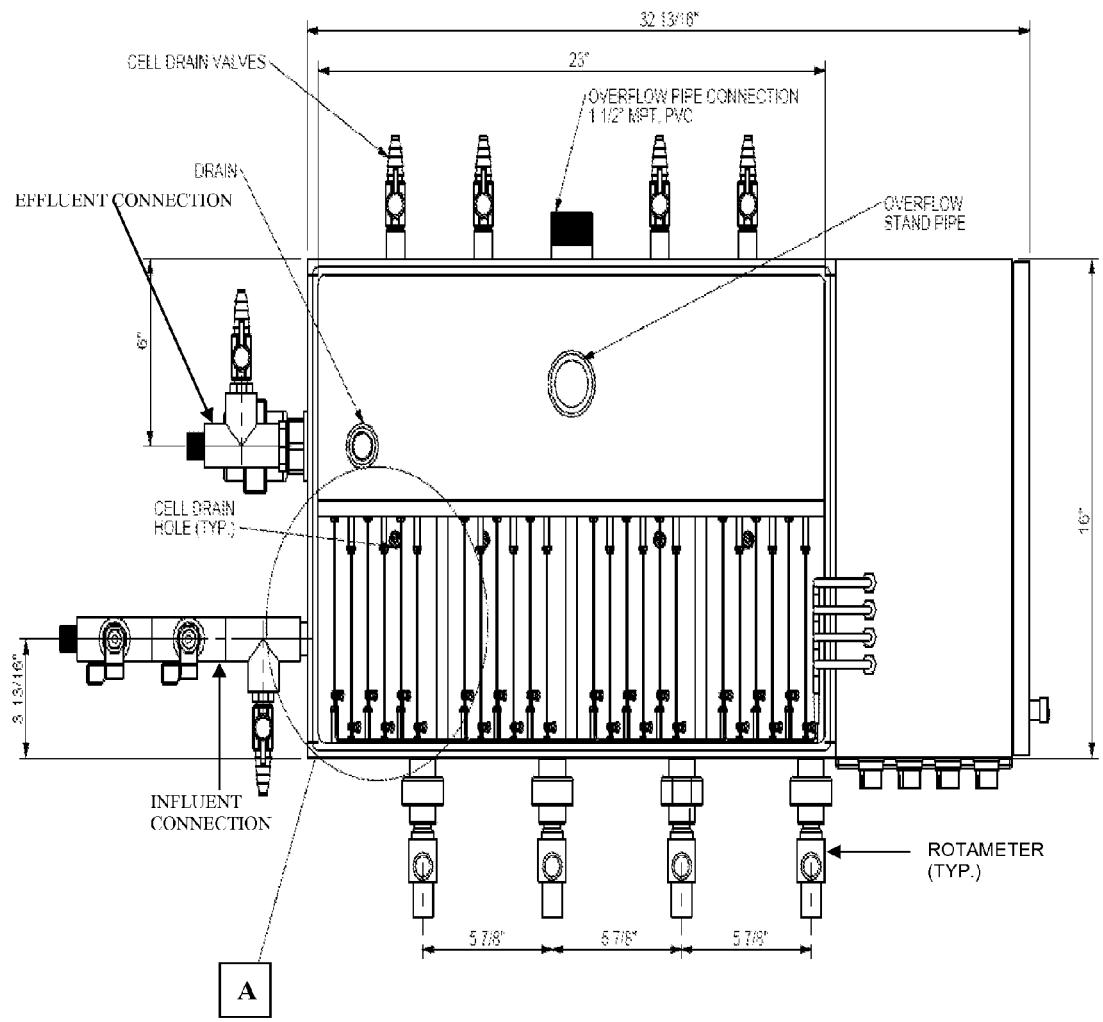
FIG. 5 Top view of the electrolytic cell.
Figure 6:
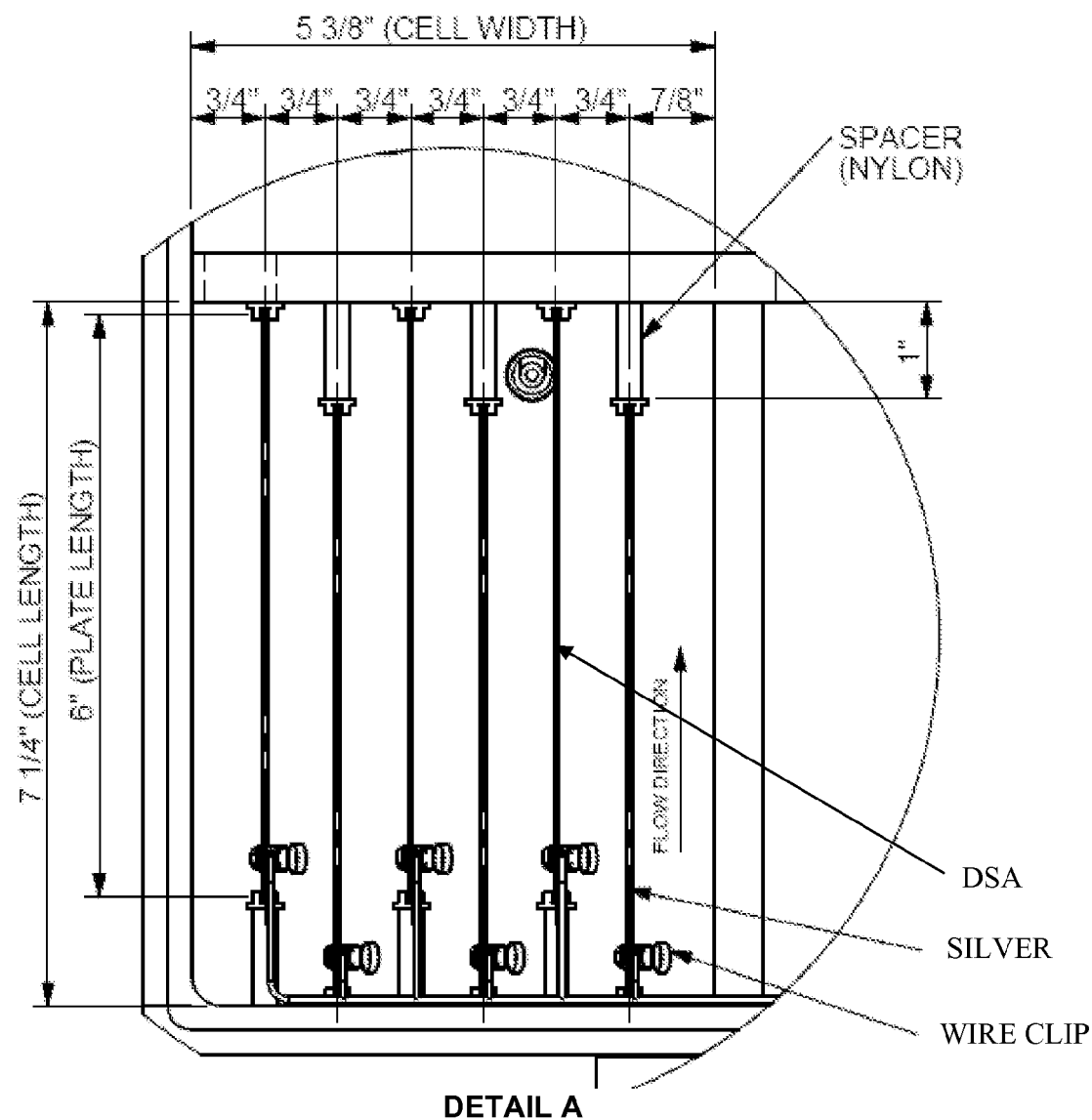
FIG. 6 Detail of the cell section carved out of FIG. 5. It gives a blow out view of a typical cell chamber in the four chamber electrolytic cell used for the process.

Water to be treated flows through a pipe or a channel—FIG. 5 (Influent connection)—and is split among the electrolytic cells, if more than one, through weirs or valves—FIG. 5 (Rotameter). The cells use silver cathodes and dimensionally stable anodes (DSA) made from a proprietary coating of mixed metal oxides and catalytic precious metals (titanium, iridium and ruthenium)—FIG. 6—Detail A. DSA can also be used as the cathode when a smaller fraction of bromide ions is required to be removed. With DSA electrodes, polarity can be switched at intervals to keep the electrodes clean. With silver cathodes, polarity switching is avoided to prevent making the silver sacrificial. The electrodes are powered with variable and controllable current. The maximum current density applied was 20 mA/in² of submerged electrode surface area. The electrodes are arranged in a parallel baffling fashion that ensures serpentine flow pattern resulting in several passes through the cells—FIG. 6—Detail A. Electrode distance is maximized to ensure efficient power consumption. It can be made adjustable based on influent bromide level and desired fraction to be removed. As water, the electrolyte, travels the length and width of the cell, it gets in contact with the electrodes for a determined amount of time based on the size of the cell and water flow rate. Electrolytic reactions are initiated to separate the compounds in solution to cations and anions. During the electrolysis, hydrogen and oxygen are formed at the cathode and anode respectively. Chlorine and bromine as gases, hypochlorite ions, hypobromite ions, hypochlorous and hypobromous acids are also formed—FIG. 3 (Schematic of fate of bromide). If iodide is present in the water, iodine is also formed. Some of these gases rise to the surface and are liberated from the cell and some remain in solution depending on their concentrations and the amount of current applied. Bromine that is not liberated stays in solution and forms low level hypobromite ions and hypobromous acid. The water exits the cells through weirs or valves—FIG. 4 (Cell Outlet)—into a channel and directed toward the conventional water treatment steps—FIG. 4 (Effluent Connection)—of coagulation, flocculation, sedimentation and GAC filtration—FIG. 2 (Process Schematics). As such, low concentration halides like bromide and iodide are almost completely removed in the electrolytic cell based on the current density, chloride to bromide ratio, cell residence time, solution ionic strength, electrode distance and electrode material. Total Organic Carbon (TOC) is reduced by conventional treatment and GAC. Chloride is usually present in high concentrations in natural waters, especially from estuaries, therefore chloride ions bond with oxygen atoms to form hypochlorite. The presence of sodium hypochlorite and hypobromous acid starts the water disinfection process of killing bacteria within the cells and reduces the total amount of disinfectant needed in the water treatment process. The removal of bromide and TOC from the source water reduces the formation of disinfection byproducts, especially the United States Environmental Protection Agency (USEPA) regulated trihalomethanes and haloacetic acids, upon subsequent disinfection of the water with chlorine. While modest reduction in trihalomethanes concentration will be achieved with TOC removal by GAC, in water with considerable amount of bromide, speciation will shift towards the brominated halomethanes. Removing bromide results in lower total halomethanes as less bromine containing halomethanes are formed upon chlorination. This will prolong the life of the GAC since on exhausting the adsorptive capacity, biological activity can sustain the effluent TOC at a level ($\leq 1.5$ mg/L) commensurate with the TTHM formation goal of $\leq 80$ µg/L at 3 day SDS when bromide is $\leq 100$ µg/L. In typical operation with bromide above 100 µg/L, it is necessary to maintain TOC below 1 mg/L to avoid >80 µg/L TTHM 3 day SDS by continuously using the GAC's adsorptive capacity to achieve such TOC effluent goal. This is why GAC typically lasts 60-120 days.

Figure 3:
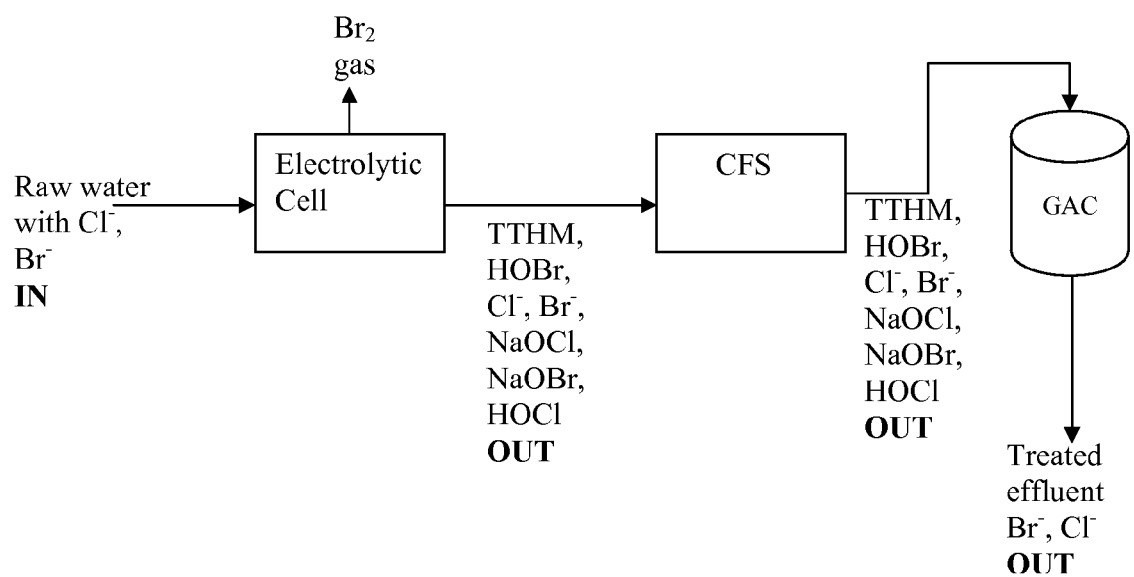
FIG. 3 Fate of bromide through the process.

FIG. 3 illustrates the fate of bromide in this electrolytic cell invention. Bromide in the influent water, mainly NaBr, gets converted to bromine gas and other bromide compounds (HOBr, NaOBr, and brominated TTHM) in various concentrations while some NaBr will remain unconverted. Ion chromatography analysis accounts for bromide in these bromide compounds except brominated TTHM which is considered insignificant at this point. Continued formation of TTHM in the cell effluent sample based on chlorine residual is minimized by completing bromide analysis within a few hours of sample collection to show that organically bound bromide concentration is insignificant. Formed bromine gas is liberated from the cell resulting in substantial removal depending on influent bromide concentration and the cell operating conditions. In the CFS, there is further formation of TTHM because of the presence of chlorine, bromide, TOC and contact time of about 2 hours. Because more bromide is now organically bound in the TTHM, ion chromatography analysis usually shows less bromide in the CFS effluent compared to cell effluent concentration. As the CFS effluent passes through the GAC, TTHM dissociates releasing the organically bound bromide such that bromide analysis of the GAC effluent is the total bromide in the water. The concentration of bromide in the GAC effluent is comparable to the cell effluent confirming that the bromide loss in the process is the bromine gas liberated from the cell especially when the cell effluent chlorine residual is <1 mg/L and influent bromide is ≧0.200 mg/L.

Bromide always occurs together with chloride in seawater such that the $Cl^-$:$Br^-$ ratio in seawater impacted surface water sources can range between 240:1 and 522:1. In all current methods of bromine production, chlorine, which has a higher reduction potential than bromide, is used to oxidize bromide to bromine as represented by Eqn. 1. The use of highly conductive metal like silver as the cathode during electrolysis prevents the bromine from going completely into solution but also given off as gas.

$$2Br^- + Cl_2 \rightarrow Br_2 + 2Cl^{-1} \quad \text{Eqn. 1}$$

The forward reaction in the electrolytic cell is a plug flow reactor $2^{nd}$ order reaction based on the assumption that the concentration of chloride as reactant or product does not change and it is overwhelmingly greater than bromide:

$$-r_A = kC_A^2$$

$r_A$ = rate of reaction
$C_A$ = concentration of bromide, mole/L
k = reaction rate constant, Liters/mole-sec, $k_{obsd}$ = 1.66×10⁶ L M⁻¹ s⁻¹

Figure 1:
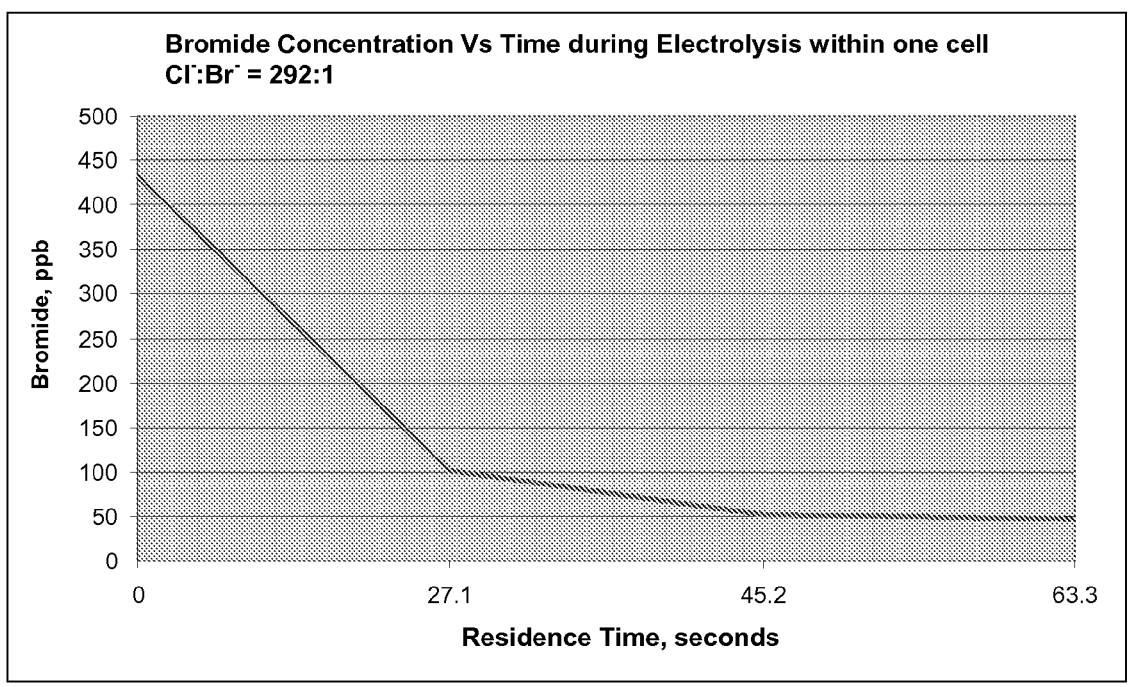
FIG. 1 Bromide concentration versus Time within the electrolytic cell

The rate of reaction increases with the square of the concentration and decreases rapidly as the concentration of the reactant decreases (FIG. 1)

When bromine dissolves in water if forms hypobromous acid:

$$Br_2 + H_2O \rightarrow HOBr + H^+ + Br^- \quad \text{Eqn. 2}$$

Many studies have demonstrated that HOBr is highly reactive and produces both $Br_2$ and BrCl depending either on the pH or on the relative concentrations of chloride and bromide ions. Therefore, some of the HOBr may be given off as gas. Bromine is soluble in chlorine in all proportions yielding an equilibrium mixture of the interhalogen bromine chloride.

The following reaction schemes have been proposed:

$$Br_2 + Cl_2 = 2 \rightarrow BrCl \quad \text{Eqn. 3}$$

$$HOBr + Cl^- + H^+ \rightarrow BrCl + H_2O \quad \text{Eqn. 4}$$

Hypobromous acid can also dissociate to form bromide ion during electrolysis.

$$HOBr + H^+ + 2e^- \rightarrow Br^- + H_2O \quad 1.331V \quad \text{Eqn. 5}$$

$$HOBr + H^+ + e^- \rightarrow \tfrac{1}{2}Br_2(aq) + H_2O \quad 1.574V \quad \text{Eqn. 6}$$

Half cell reactions of electrolysis based on chloride and bromide separately are as follows:

Cathode (Reduction):

$$Br_2 + 2e^- \rightarrow 2Br^- \quad 1.10V \quad \text{Eqn. 7}$$

$$Cl_2 + 2e^- \rightarrow 2Cl^- \quad 1.36V \quad \text{Eqn. 8}$$

Anode (Oxidation):

$$2Br^- \rightarrow Br_2 + 2e^- \quad -1.10V \quad \text{Eqn. 9}$$

$$2Cl^- \rightarrow Cl_2 + 2e^- \quad -1.36V \quad \text{Eqn. 10}$$

The forward reaction of eqn. 1 occurs at the anode where chloride is oxidized to chlorine by releasing electrons with the chlorine immediately oxidizing bromide to bromine. Some of the bromine goes into solution to form hypobromous acid (HOBr) (Eqn. 2). The HOBr in combination with H⁻ results in a very low pH at the anode. The extent of all these reactions depends on the following parameters:

1. chloride:bromide ratio
2. electrical energy supplied for the electrolysis
3. ionic strength of the solution
4. electrode distance or effective electrode area/cell volume
5. cell residence time
6. Electrode material The alkaline condition (pH 7.5 to 7.8) of the raw water promotes the formation of hypobromite ions according to Eqn. 11 and forms bromate ions if the cell residence time is long enough (Eqn. 12) in the presence of ferric ions.

$$Br_2 + 2OH^- \rightarrow Br^- + BrO^- + H_2O \quad \text{Eqn. 11}$$

$$3BrO^- \rightarrow 2Br^- + BrO_3^- \quad \text{Eqn. 12}$$

Eqn. 1 is the precursor for the other equations because most of the subsequent reactions cannot proceed without the presence of chloride in the electrolyte. In a synthetic solution of about 400 µmhos/cm made with Potassium bromide (KBr) to form about 1000 µg/L of bromide in de-ionized water and adjusted to about pH 7.5 with sulfuric acid and sodium carbonate, electrolysis using silver cathode and DSA at 20 mA/in² of submerged electrode surface area resulted in minimal bromide removal even at extended residence time. 1060 µg/L bromide dropped to 973 µg/L at 101 seconds cell residence time with no detectable bromine or hypobromous acid in solution suggesting loss only as bromine gas. However, 34 µg/L of bromate was formed in the absence of ozone indicating that Eqn. 7, Eqn. 9, Eqn. 11 and Eqn. 12 dominate. Ozone is not formed as a by-product during electrolysis. It is possible to have more bromide loss in the absence of chloride at residence time of several minutes.

Electrolytic cell effluent pH does not differ significantly from the influent pH. It is slightly higher because of the overwhelming concentration of chloride over bromide which results in the formation of chlorine as sodium hypochlorite (Eqn. 13).

$$NaCl + H_2O \rightarrow NaOCl + H_2 \quad \text{Eqn. 13}$$

The examples discussed below elucidate the process.

EXAMPLE 1

| Cathode/ Anode | Cl⁻:Br⁻ Ratio | Current Density, mA/in² of total electrode surface area | Cell Effl. Cl₂ Res. mg/L | Cell RT, secs | Infl Br⁻, mg/L | Cell Effl Br⁻, mg/L | CFS Effl Br⁻, mg/L | GAC1 Effl Br⁻, mg/L | GAC2 Effl Br⁻, mg/L |
|---|---|---|---|---|---|---|---|---|---|
| DSA/DSA | 190:1 | 14 | 0.83 | 36.2 | 0.213 | 0.080 | 0.063 | 0.076 | 0.090 |
| DSA/DSA | 181:1 | 14 | 0.60 | 63.3 | 0.221 | 0.117 | 0.094 | 0.118 | 0.129 |
| Ag/DSA | 166:1 | 14 | 0.71 | 50.6 | 0.243 | 0.095 | 0.066 | 0.104 | 0.107 |
| Ag/DSA | 101:1 | 14 | 0.67 | 60.0 | 0.401 | 0.191 | 0.157 | 0.202 | 0.181 |
| Ag/DSA | 230:1 | 14 | 1.52 | 39.0 | 0.461 | 0.048 | 0.050 | 0.095 | 0.120 |
| Ag/DSA | 424:1 | 14 | 1.0 | 46.0 | 0.108 | 0.021 | 0.017 | 0.057 | 0.063 |
| Ag/DSA | 424:1 | 14 | 0.73 | 40.5 | 0.112 | 0.028 | 0.021 | 0.043 | 0.049 |
| Ag/DSA | 408:1 | 14 | 0.69 | 36.2 | 0.125 | 0.039 | 0.028 | 0.048 | 0.055 |

The table above shows bromide removal under different Cl⁻:Br⁻ ratios, residence times and influent bromide concentrations. Ag/DSA electrode combination performs better than DSA/DSA. At 50.6 seconds RT, Cl⁻:Br⁻ ratio of 166:1 and influent bromide concentration of 0.243 mg/L versus 63.3 seconds RT, Cl⁻:Br⁻ ratio 181:1 and influent bromide concentration of 0.221 mg/L for Ag/DSA and DSA/DSA respectively, Ag/DSA has lower final bromide concentration of 0.104 mg/L at the GAC effluent compared to 0.118 mg/L for DSA/DSA despite the higher Cl⁻:Br⁻ ratio, residence time, and lower influent bromide concentration. Bromide removal tends to be more difficult at lower influent bromide concentration. At lower concentrations (<0.125 mg/L) with 408:1-424:1 Cl⁻:Br⁻ ratio, removal ranges between 48%-62% but as concentrations go up (>0.200 mg/L) with 166:1-190:1 Cl⁻:Br⁻ ratio, the range is between 47%-79%. With the Cl⁻:Br⁻ ratio at 101:1 and influent bromide of 0.401 mg/L, removal is 55% whereas removal is 79% when the Cl⁻:Br⁻ ratio is 230:1 and influent bromide is 0.461 mg/L indicating the importance of chloride level in the reaction.

EXAMPLE 2

TABLE 10

3-DAY TTHM SDS at 25° C. - 14 mA/in²,
Ag/DSA Electrolysis at 39 secs RT.
Cl⁻:Br⁻ ratio = 230:1 - Spiked Chloride/Bromide

| | RAW | CELL | CFS | GAC1 Effluent | GAC2 Effluent |
|---|---|---|---|---|---|
| Chlorine Res, mg/L | ND | 1.52 | 0.53 | ND | ND |
| Adjusted pH, units | 7.64 | 7.64 | 7.65 | 7.56 | 7.64 |
| TOC, mg/L | 2.67 | 2.66 | 1.75 | 0.89 | 0.92 |
| Bromide, µg/L | 461 | 47.7 | 49.8 | 94.7 | 120 |
| Chlorine dose, mg/L | 5 | 4 | 3 | 2 | 2 |
| Chlorine Res., mg/L (3 days) | 0.04 | 0.13 | 1.21 | 0.99 | 1.09 |
| BDCM | 53.0 | 50.0 | 43.7 | 12.0 | 12.0 |
| TBM | 62.0 | 35.0 | 30.2 | 12.9 | 15.8 |
| TCM | 16.3 | 26.8 | 18.8 | 4.8 | 3.8 |
| DBCM | 109 | 79.0 | 75.0 | 21.8 | 23.8 |
| TTHM | 240 | 191 | 168 | 51.5 | 55.4 |

TABLE 11

3-DAY TTHM SDS at 25° C. - 14 mA/in²,
Ag/DSA Electrolysis at 46 secs RT.
Cl⁻:Br⁻ ratio = 424:1 Natural Ratio

| | RAW | CELL | CFS | GAC1 Effluent | GAC2 Effluent |
|---|---|---|---|---|---|
| Chlorine Res, mg/L | ND | 1.0 | 0.23 | ND | ND |
| Adjusted pH, units | 7.63 | 7.63 | 7.61 | 7.65 | 7.56 |
| TOC, mg/L | 2.75 | 2.74 | 1.82 | 0.84 | 1.02 |
| Bromide, µg/L | 108 | 20.5 | 17.0 | 56.5 | 62.6 |
| Chlorine dose, mg/L | 5 | 4 | 3 | 2 | 2 |
| Chlorine Res., mg/L (3 days) | 0.18 | 0.27 | 0.91 | 0.98 | 1.05 |
| BDCM | 60.0 | 50.0 | 35.0 | 12.6 | 15.2 |
| TBM | 3.3 | 3.0 | 3.90 | 5.70 | 7.80 |
| TCM | 76.0 | 67.0 | 35.7 | 7.00 | 7.60 |
| DBCM | 33.3 | 29.2 | 25.6 | 15.8 | 20.0 |
| TTHM | 173 | 149 | 100 | 41.1 | 50.6 |

3-day Simulated Distribution System TTHM on raw water, cell effluent, settled water and GAC effluent show the effect of less bromide concentration on TTHM speciation and overall impact of precursor removal on TTHM concentration. 3-Day SDS TTHM concentration of the raw water at 461 µg/L bromide and 2.67 mg/L TOC is 240 µg/L. Chlorine dose of 5 mg/L resulted in chlorine residual of 0.04 mg/L which means that chlorine demand is not met and potential for TTHM formation is prematurely terminated. At the cell effluent, bromide concentration dropped to 47.7 µg/L, TOC was 2.66 mg/L, 3-Day SDS TTHM was 191 µg/L and chlorine residual was detectable at 0.13 mg/L. Brominated THM concentration dropped from 224 µg/L to 164 µg/L, a 27% reduction. The same trend is noticeable but less pronounced when raw water bromide concentration was 108 µg/L. There was 15% drop in brominated THM confirming the difficulty of bromide removal at low bromide concentrations. At the GAC effluent, TOC level is substantially reduced in comparison to settled water and 3-Day SDS TTHM results indicate that <80 µg/L can be achieved as long as TOC is ≦1.4 mg/L and bromide is ≦100 µg/L.

The invention claimed is:

1. A process of water treatment in which bromide removal is accomplished in an electrolytic cell with silver cathode and DSA anode or DSA cathode and DSA anode powered with controlled and variable amount of current further comprising conventional water treatment and GAC filtration or other means of TOC removal so that the bromide and TOC concentrations are reduced to less than or equal to 100 ppb and less than or equal to 1.5 mg/L respectively before addition of chlorine thereby reducing TTHM, haloacetic acids and specifically other brominated disinfection byproducts in finished water.

2. The process of claim 1 in which the extent of bromide removal based on the chloride:bromide ratio and the ionic strength of the solution can be adjusted by controlling the electrical energy supplied for the electrolysis, electrode distance or effective electrode area/cell volume, cell residence time and the choice of silver or DSA as cathode while using DSA as anode.

3. The process of claim 1 in which there is self generation of chlorine and bromine from chloride and bromide present in the source water so that disinfection of the water starts within the electrolytic cell without adding any disinfectant at that stage of the water treatment train resulting in a substantial reduction of the total coliform bacteria density in the cell effluent compared to the influent.

* * * * *

UNITED STATES PATENT AND TRADEMARK OFFICE
CERTIFICATE OF CORRECTION

| | | |
|---|---|---|
| PATENT NO. | : 7,384,564 B2 | Page 1 of 1 |
| APPLICATION NO. | : 11/465542 | |
| DATED | : June 10, 2008 | |
| INVENTOR(S) | : Bo Labisi | |

It is certified that error appears in the above-identified patent and that said Letters Patent is hereby corrected as shown below:

On the front of the Patent, the inventor "Labisi Bo" should be -- Bo Labisi --.

Signed and Sealed this

Twenty-sixth Day of August, 2008

JON W. DUDAS
*Director of the United States Patent and Trademark Office*